United States Patent
Tseng et al.

(10) Patent No.: US 10,475,077 B2
(45) Date of Patent: Nov. 12, 2019

(54) DISPLAYING ADVERTISEMENTS WITH LOCATION INFORMATION

(71) Applicant: Facebook, Inc., Menlo Park, CA (US)

(72) Inventors: Erick Tseng, San Francisco, CA (US); Michael John Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 589 days.

(21) Appl. No.: 14/305,997

(22) Filed: Jun. 16, 2014

(65) Prior Publication Data
US 2015/0363826 A1 Dec. 17, 2015

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0259* (2013.01); *G06Q 30/0261* (2013.01); *G06Q 30/0276* (2013.01); *G06Q 50/01* (2013.01)

(58) Field of Classification Search
CPC ........... G06Q 30/0259; G06Q 30/0261; G06Q 30/0264
See application file for complete search history.

(56) References Cited

U.S. PATENT DOCUMENTS

| | | | | |
|---|---|---|---|---|
| 2001/0049635 A1* | 12/2001 | Chung | ................ | G06F 17/3089 705/14.73 |
| 2003/0195753 A1* | 10/2003 | Homuth | ................. | G06Q 30/02 379/266.01 |
| 2010/0156933 A1* | 6/2010 | Jones | ..................... | G06Q 30/02 345/629 |
| 2012/0047147 A1* | 2/2012 | Redstone | ............ | G06F 17/3087 707/748 |
| 2012/0078916 A1* | 3/2012 | Tseng | ................ | G06F 17/30867 707/748 |
| 2012/0105475 A1* | 5/2012 | Tseng | ................. | G01C 21/3611 345/633 |
| 2012/0166452 A1* | 6/2012 | Tseng | ................ | G06F 17/30867 707/749 |
| 2013/0073371 A1* | 3/2013 | Bosworth | .............. | G06Q 30/02 705/14.35 |
| 2013/0095857 A1* | 4/2013 | Garcia | .................... | H04W 4/02 455/456.3 |
| 2013/0173160 A1* | 7/2013 | Meisels | ............ | G06F 17/30241 701/537 |
| 2013/0203439 A1* | 8/2013 | Lifshitz | ................. | H04W 64/00 455/456.2 |
| 2013/0332208 A1* | 12/2013 | Mehta | .................... | G06Q 10/02 705/5 |
| 2014/0141808 A1* | 5/2014 | Deng | .................... | H04W 4/206 455/456.3 |

(Continued)

*Primary Examiner* — Meredith A Long
(74) *Attorney, Agent, or Firm* — Fenwick & West LLP

(57) ABSTRACT

Advertisement content associated with an entity having a physical location is selected for display to a user by a client device. A proximity of the client device to the physical location is determined. In response to determining the proximity between the client device and the physical location, an advertisement is generated that includes the advertisement content and an indicator of the physical location. The generated advertisement is sent to the client device for display to the user.

20 Claims, 4 Drawing Sheets

(56) References Cited

U.S. PATENT DOCUMENTS

| | | | | |
|---|---|---|---|---|
| 2014/0156410 A1* | 6/2014 | Wuersch | ............ | G06Q 30/0261 |
| | | | | 705/14.58 |
| 2015/0038171 A1* | 2/2015 | Uilecan | ................ | G06Q 10/109 |
| | | | | 455/456.3 |
| 2015/0213414 A1* | 7/2015 | Zuckerman | ........ | G06Q 10/1095 |
| | | | | 705/7.19 |

* cited by examiner

DISPLAYING ADVERTISEMENTS WITH LOCATION INFORMATION

BACKGROUND

This disclosure relates generally to advertising, and in particular to advertisements associated with entities having physical locations.

Advertisers often promote goods and services to users via online systems. Online advertisements typically enable users to quickly take actions on ads. For example, users can interact with online advertisements to visit a webpage of an entity associated with the advertisement, purchase goods and services, and so forth. Many of these actions can be taken without leaving the context of the advertisements.

However, while online advertisements enable users to easily take actions on ads for products or services available online, online advertisements for entities having physical locations do not provide sufficient information about the physical locations of the entities within the context of the ads for users to take action on the ads. A user who desires more information about the physical locations must leave the context of the ads to retrieve such information. The user often must also travel some distance to reach the physical locations of the entities. Accordingly, it is difficult for users to take actions on ads for entities having physical locations. Furthermore, if users are unaware of the physical locations associated with ads being displayed to them, they may not be motivated to seek out the physical locations.

SUMMARY

To encourage users to take actions on advertisements for entities having physical locations, an online system displays advertisements for entities having physical locations that include information about the physical locations. The online system selects advertisement content that is associated with an entity having a physical location for display by a client device of a user. The online system determines a proximity of the client device to the physical location associated with the advertisement content. In some embodiments, the client device is in proximity to the physical location at the time the advertisement content is selected for display to the user. In other embodiments, the online system determines that the client device was in proximity to the physical location before the advertisement content was selected, or is expected to be in proximity to the physical location at a future time. If multiple physical locations are associated with the advertisement content, the online system selects one of the physical locations based on one of a variety of factors, such as the physical location that is closest to the client device or the physical location that has the shortest wait time.

In response to determining the proximity of the client device to the physical location associated with the advertisement content, the online system generates an advertisement including the advertisement content and an indicator of the physical location. In various embodiments, the indicator of the physical location includes a distance between the client device and the physical location, a travel time to the physical location, and/or a compass heading indicating a direction to the physical location. The advertisement may also include other information about the physical location to encourage users to take an action on the advertisement, including a selectable link to a page with further information relevant to the physical location.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
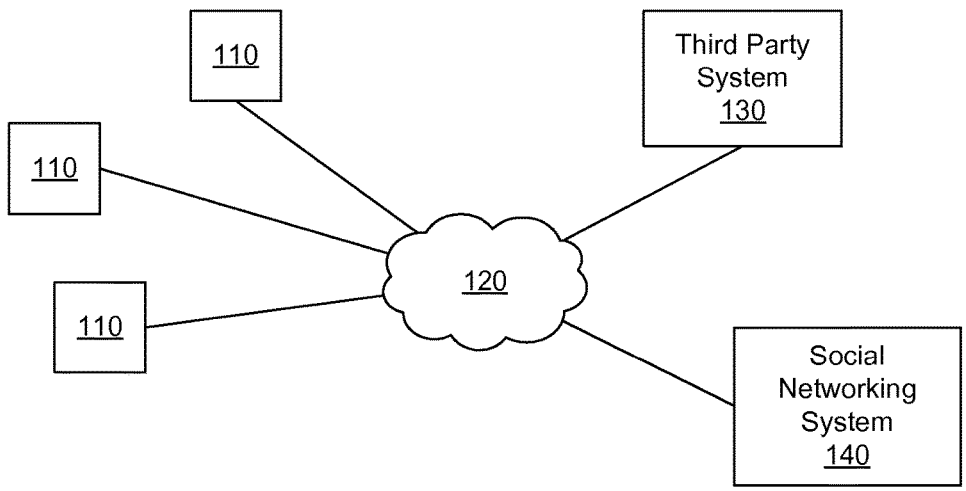
FIG. 1 is a block diagram of a system environment in which a social networking system operates, according to one embodiment.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™. The client devices 110 may also execute other applications providing various functionality to users of the client devices 110. For example, the client devices 110 may execute navigation applications, restaurant reservation applications, applications enabling users to place orders at restaurants, ticket reservation applications, appointment scheduling applications, and so forth. In some embodiments, the client devices 110 include location tracking functionality, and can identify the locations of the devices based on global positioning, IP address, triangulation to nearby cellular towers, or any other mechanism. In one embodiment, a user of the client device 110 can disable or opt out of location tracking on the device, and the client device 110 will not track the device's location. In other cases, the client device 110 only tracks location if the user opts in to location tracking.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
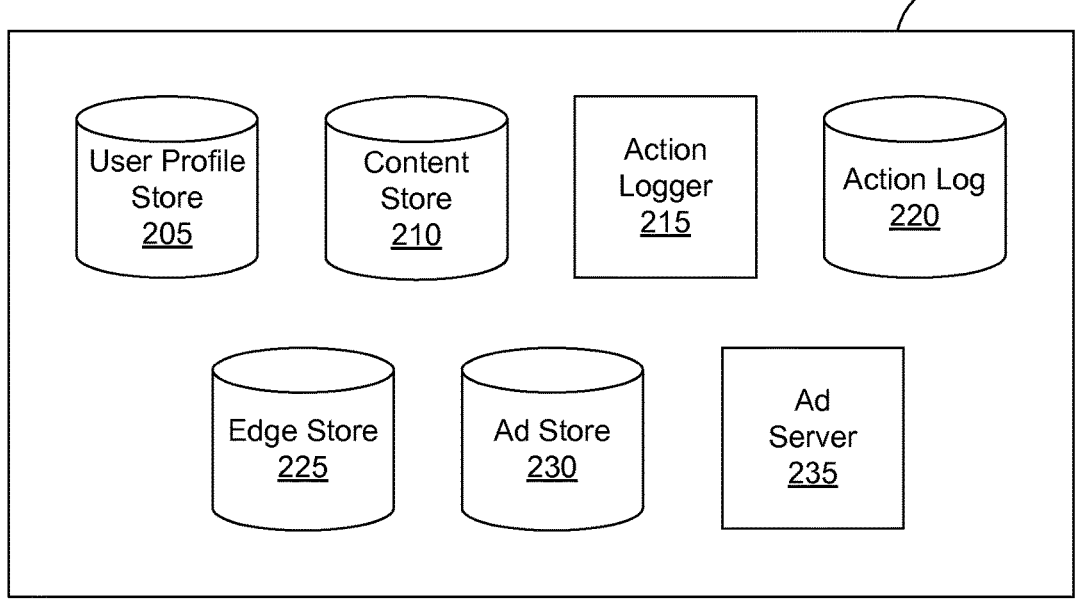
FIG. 2 is a block diagram of a social networking system, according to one embodiment.

FIG. 2 is an example block diagram of an architecture of the social networking system 140. The social networking system 140 shown in FIG. 2 includes a user profile store 205, a content store 210, an action logger 215, an action log 220, an edge store 225, an ad store 230, and an ad server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location, and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220. Furthermore, a user profile may include locations in which the user has been.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The ad store 230 stores one or more advertisement requests ("ad requests"). An advertisement request includes advertisement content and a bid amount. The advertisement content is text, image, audio, video, or any other suitable data presented to a user to advertise an entity (e.g., a business or an organization). In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

In one embodiment, the ad requests are also associated with physical locations of entities. If an entity associated with ad content has one or more physical locations, the ad request may be associated with an identifier of each physical location (e.g., a street address or GPS coordinates). Alternatively, the ad request may be associated with a link to a website, database, or other source including a list of identifiers of the physical locations of the entity.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile, edges, and/or actions associated with a user to identify users having user profile information, edges, or actions satisfying at least one of the targeting criteria. Hence, the targeting criteria allow an advertiser to identify groups of users matching specific targeting criteria, simplifying subsequent distribution of content to groups of users.

In one embodiment, the targeting criteria may specify actions or types of connections between a user and another user or object of the social networking system 140. The targeting criteria may also specify interactions between a user and objects performed external to the social networking system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object. As yet another example, targeting criteria may identify users who are or have been in proximity to a physical location of an entity associated with an advertisement.

The ad server 235 serves ads from the from the ad store 230 to users via the client devices 110. The ad server 235 selects ads to present to a user, and sends the ad content of the selected ads to a client device 110 of the user. In some embodiments, the ad server 235 serves ads to client devices 110 that are associated with physical locations. For example, the ad server 235 serves, to users, ads that are associated with stores, restaurants, coffee shops, tourist attractions, service providers (e.g., doctors, mechanics, or child care providers), or any other type of entity having physical locations (as opposed to entities operating entirely online, for example). When serving an ad associated with a physical location, the ad server 235 may include information about the physical location in the ad to help users take action on the ad.

Figure 3:
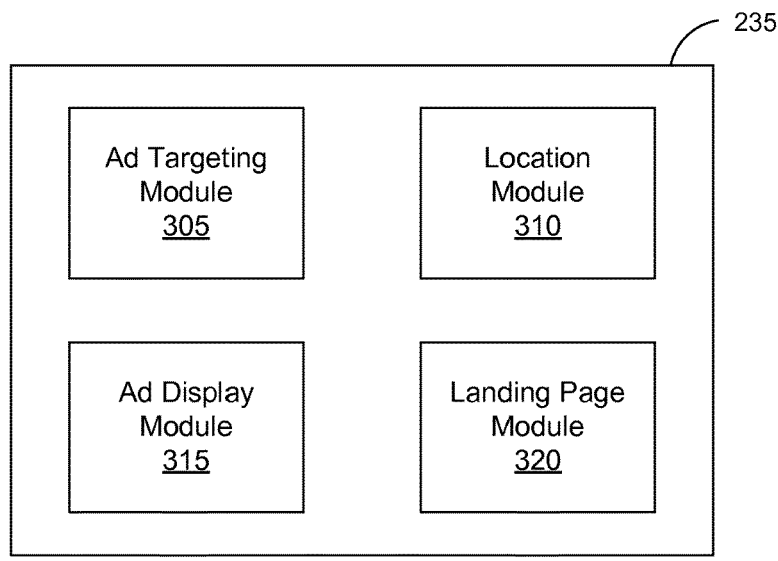
FIG. 3 is a block diagram of an ad server, according to one embodiment.

FIG. 3 is a block diagram illustrating modules within the ad server 235. In one embodiment, the ad server 235 includes an ad targeting module 305, a location module 410, an ad display module 315, and a landing page module 320. Other embodiments of the ad server 235 may include additional or different modules, and the functionality may be distributed differently between the modules.

The ad targeting module 305 selects ads to present to a user of the client device 110. In one embodiment, the ad targeting module 305 selects ads from the ad store 230 to display to the user based on targeting criteria of the ads, user profile information of the user, bid amounts associated with each ad, or other factors. Any of a variety of ad targeting and bidding methods may be used to select an ad for display to a user. One embodiment of the ad targeting module 310 selects ads based in part on a predicted future location of the client device 110. For example, if the user is predicted to travel a particular route based on the location history of the client device 110, the ad targeting module 310 selects ads to display to the user that advertise entities having physical locations on or near the user's predicted route.

The location module 310 determines current and historic locations of a client device 110. If the user of the client device 110 has opted in to location tracking, the location module 310 may access the location determined by the client device 110 to determine current locations of the device. Furthermore, by monitoring locations of the client device 110 over time, the location module 310 builds a history of locations of the client device 110. The location module 310 periodically samples the locations of the client device and stores the locations in the user's user profile. In one embodiment, the location module 310 also uses the location history to predict the future location of the client device 110. The location module 310 uses the location history to identify patterns in the user's movements. For example, the location module 310 uses the location history to identify locations the user frequents, such as home, work, and the route the user travels between home and work. Similarly, the location module 310 uses the location history to identify times or days of the week the user visits particular locations. For example, the location module 310 determines the user is typically at work between Sam and 5 pm and at home from 6 pm to 7 am each day from Monday to Friday, and commutes by a particular route from 7 am to Sam and 5 pm to 6 pm. Based on patterns observed in the location history, the location module 310 predicts locations of the client device 110 at particular time. For example, the location module 310 predicts the client device 110 will be at the user's work location Monday at 1 pm based on the observed patterns.

The location module 310 also determines physical locations of entities associated with advertisements that are in proximity to a user's location. When an ad is selected for display to a user, the location module 310 accesses location information of the entity associated with the ad. For example, the location module 310 retrieves the entity's location or locations from public map data, from a website of the entity, from the ad store 230 that stores locations that may have been provided by an advertiser associated with the entity, or from other sources. In general, the location module 310 determines physical locations that are in proximity to a user's location by determining a distance between the user's present location or various historical locations of the user and the advertising entity's physical locations, or by determining an amount of time a user would take to travel from the user's present location to the physical locations. If the distance or travel time is less than a threshold, the location module 310 determines a proximity of the user to the entity's physical location.

In one embodiment, the location module 310 determines a distance or travel time from the location of the client device 100 to the physical location of the entity associated with an advertisement at the time the ad is selected for display via the client device 110. If the distance or travel time is less than a threshold, the location module 310 determines the client device 110 to be currently in proximity to the physical location of the entity. The threshold distance may be a fixed value, such as one mile. Alternatively, one embodiment of the location module 310 determines a threshold distance based on a mode of transportation frequently used by the user of the client device 110. For example, the location module 310 applies a larger threshold distance for a user who frequently drives than for a user who frequently walks. Furthermore, if a user frequently takes public transportation, the location module 310 may use a distance by public transportation routes to the physical location associated with the ad rather than an absolute distance.

In another embodiment, the location module 310 determines a distance between the physical location of the entity associated with an advertisement and a previous location of the client device 110. The location module 310 accesses the location history of the client device 110 and determines if the client device 110 was within a threshold distance of the physical location of the entity. In one embodiment, the location module 310 searches recent location history of the client device 110 to determine if the client device 110 was in proximity to the entity's physical location. For example, the location module 310 searches a location history for two weeks preceding the date the ad is selected for placement, rather than searching the entire location history of the client device 110.

In yet another embodiment, the location module 310 determines a distance between the physical location of the entity associated with an advertisement and a predicted location of the client device 110. The location module 310 predicts future locations of client device 110 based on the device's location history. For example, the location module 310 predicts the client device 110 will be at the user's work location at certain times on certain days. The location module 310 determines whether a predicted location of the client device 110 is in proximity to the physical location of the entity. In some embodiments, the predicted location of the client device 110 is a route between predicted destinations. For example, the location module 310 predicts a route a user travels between the user's home and work. In this example, the location module 310 may determine a proximity of the physical location associated with an ad to a route traveled by the user. Furthermore, one embodiment of the location module 310 determines a proximity between the physical location associated with the ad and the locations a client device 110 is predicted to be for a specified period of time after the ad is selected, such as one week.

If the entity has multiple physical locations, one embodiment of the location module 310 selects one of the physical locations to associate with the advertisement. In various embodiments, the location module 310 selects the physical location to associate with the ad based on distance or travel time to the current, historical, or predicted location of the client device 110, based on current wait time at the various locations, based on hours each location is open, or based on other factors. For example, if multiple physical locations of the entity are within a threshold distance of the user, the location module 310 selects the physical location nearest to the user or the shortest travel time away from the user. In this example, the location module 310 accesses map data and/or traffic data to select the physical location. As another example, if the physical locations are restaurants, coffee shops, service providers, or other types of entities that may have a wait time for visitors of the location, the location module 310 selects the physical location having the shortest wait time to include in the ad. In this example, the location module 310 may retrieve wait time data for the locations from websites of the entities or other systems. In yet another example, if an entity's physical locations are open different hours, the location module 310 selects a physical location that is open at the time the ad is displayed to the user, instead of a physical location that is closed at the time the ad is displayed.

The ad display module 315 generates ads for display to a user by a client device 110. For ads associated with entities having a physical location in proximity to the user, the ad display module 315 generates an ad that includes an indicator of the physical location of the entity. Indicators of physical locations include a time, distance, or direction to the physical location. The indicator can also include social context providing a statement about the proximity of the user to the location and/or the current state or status of the location (e.g., open, wait time, etc.). For example, rather than just listing a nearby location address, it might state in the ad that the physical location is open and is near the user right now or is a certain number of miles away from the user's current location. It might also indicate that another user connected to the user in the social networking system "likes" that particular nearby location (e.g., your friend Tom Banks likes The Coffee Shop in Mountain View, which is two minutes away from you, is open now, and has zero wait time). The ad display module 315 may modify properties of the physical location indicator to provide more information to a user about the location or a route between the user and the location. In one embodiment, the ad generated by the ad display module 315 also includes a selectable link that, when selected, causes the landing page module 320 to display a landing page with still further information about the physical location.

Figure 4:
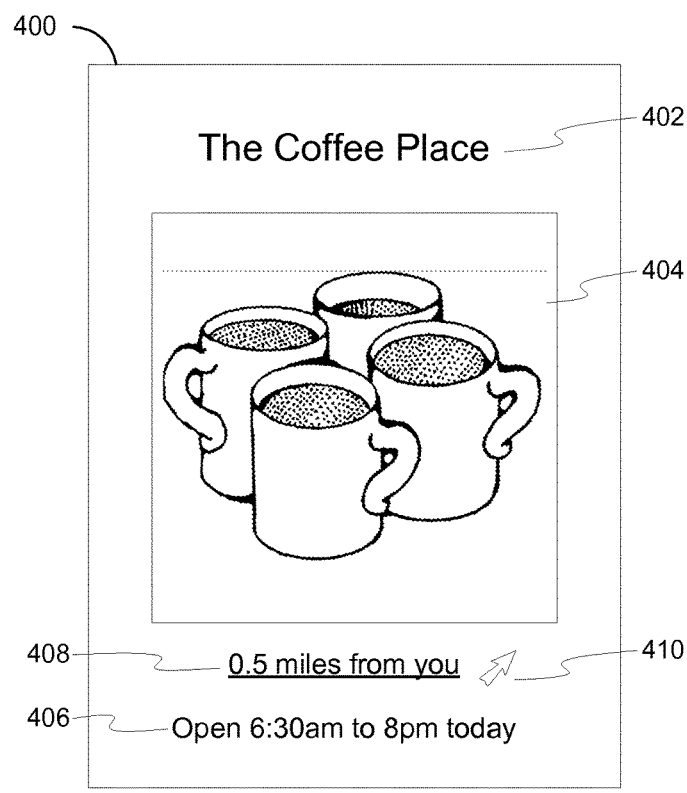
FIG. 4 illustrates an example advertisement with an indicator of a physical location.

An example ad generated by the ad display module 315 and indicating an entity's physical location is illustrated in FIG. 4. The example of FIG. 4 is an ad 400 for a coffee shop, which is a business with a physical location. The ad 400 includes advertising content provided by the entity, such as a title 402 and picture 404. In some embodiments, the user can interact with the advertiser-provided content (e.g., by clicking on the title 402 or picture 404) to view more information about the advertiser or details about the advertisement. For example, a website of the advertiser is displayed in response to the user clicking on the title 402.

As shown in FIG. 4, the ad 400 also includes information about the physical location selected to be associated with the ad. The location-specific information includes, for example, hours 406 the physical location is open. The location-specific information also includes an indicator of the physical location of the coffee shop. In the example of FIG. 4, the physical location indicator includes a distance indicator 408 indicating the distance from the client device 110 to the coffee shop and a compass heading 410 indicating the direction of the coffee shop from the location of the client device 110. Other information may also be included in the physical location indicator, such as a travel time to the coffee shop.

The distance or travel time provided in the distance indicator 408 may be a distance or time from the current location of the client device 110, the distance or time from a previous location of the client device 110, the distance or time from a predicted future location of the client device 110, or a combination thereof. For example, if the client device 110 is currently in proximity to the physical location associated with the ad 400, the distance indicator 408 provides a distance from the current location of the client device 110 to the physical location. If the client device 110 was previously in proximity to the physical location associated with the ad, the distance indicator 408 may provide a distance from the client device location that was in proximity to the physical location, the distance between the current location of the client device 110 and the physical location, or both. For example, the distance indicator 408 indicates that the client device is currently 10 miles from the physical location but was 100 yards from the physical location one day prior. Similarly, if a predicted future location of the client device 110 is in proximity to the physical location associated with the ad, the distance indicator 408 may provide a distance from the current location of the client device 110 to the physical location, a distance from the predicted future device location to physical location, or both. For example, if the physical location associated with the ad is one half mile from the route a user is predicted to travel, the distance indicator 408 may indicate both the current distance to the physical location and the distance from the predicted route.

In one embodiment, the physical location indicator includes a selectable link to more information about the physical location associated with the ad. For example, the distance indicator 408 is a selectable link to a landing page hosted by the ad server 235 that provides additional information about the physical location of the coffee shop. Other components of the ad 400 may additionally or alternatively be selectable links that might lead to different landing pages, such as landing pages hosted by an application executing on the client device 110 or landing pages hosted by other subsystems of the social networking system 140.

Properties of the distance indicator 408 may be modified to provide additional information to a user. In one embodiment, the distance indicator 408 is color-coded to indicate traffic between the client device 110 and the physical location. For example, the ad display module 315 displays the distance indicator 408 as green to indicate light or normal traffic between the client device 110 and the physical location, yellow to indicate heavier traffic between the client device 110 and the physical location, and red to indicate heavy traffic between the client device 110 and the physical location. In another embodiment, the distance indicator 408 is color-coded to indicate whether the physical location is currently open. For example, the ad display module 315 displays the distance indicator 408 as green to indicate that the physical location is open, yellow to indicate the physical location is closing in less than a threshold amount of time, and red to indicate the physical location is closed. In yet another embodiment, the distance indicator 408 is color-coded to indicate a wait time at the physical location.

Similarly, properties of the compass heading 410 may be modified to provide additional information to a user. In one embodiment, the ad display module 315 rotates the compass heading 410 based on orientation of the client device 110. The ad display module 315 receives an indicator of the device's orientation relative to the magnetic field of the Earth from a magnetometer of the client device 110, and rotates the compass heading 410 to point in the direction the user of the client device 110 would travel to reach the physical location associated with the ad 400. The compass heading 410 may be rotated in two dimensions (within the plane of the client device 110) or in three dimensions. For example, if the user is facing the direction of travel to the physical location associated with the ad 400, the ad display module 315 rotates the compass heading 410 to point the user forward. If the compass heading 410 is rotated in two dimensions, the ad display module 315 displays the compass heading 410 as pointing upward on the display of the client device 110. If the compass heading 410 is rotated in three dimensions, the ad display module 315 displays the compass heading 410 as pointing upward if the client device 110 is oriented parallel to the ground, and displays the compass heading 410 as pointing into the display if the client device 110 is oriented perpendicularly to the ground. In another embodiment, the ad display module 315 displays the compass heading 410 relative to a fixed axis. For example, if the physical location associated with the ad is north of the client device 110, the ad display module 315 displays the compass heading 410 as pointing upward on the display regardless of the orientation of the client device 110.

Other properties of the compass heading 410 may also be modified by the ad display module 315. For example, the ad display module 315 changes a color of the compass heading 410 to indicate an amount of traffic between the user and the physical location associated with the ad 400. As another example, the ad display module 315 changes a length of the compass heading 410 based on a distance to the physical location associated with the ad 400, such that the compass heading 410 is displayed with a longer length for longer distances and a shorter length for shorter distances.

The landing page module 320 generates a landing page providing more information about a physical location associated with an ad. For example, the landing page module 320 generates a landing page in response to a user selecting a link specific to the physical location, such as distance indicator 408. The landing page may include one or more functions associated with the physical location, such as directions to the physical location, reviews of the physical location, wait time at the physical location, a menu from the location, or an option to reserve a table, place an order, or make an appointment. In one embodiment, the landing page module 320 provides the landing page to the user by a web browser executing on the client device 110. In another embodiment, the landing page module 320 calls one or more applications executing on an operating system of the client device 110, such as the application executing on the client device 110 that enables the user to interact with the social networking system 140. In this case, the application called by the landing page module 320 displays the landing page.

In another embodiment, rather than generating a landing page displayed responsive to a user interacting with a location-specific link, the landing page module 320 directs the client device 110 to open an application executing on the client device 110. For example, the landing page module 320 opens a navigation application in response to a user interaction with the location-specific link and populates the navigation application with the address of the physical location associated with the ad. As another example, the landing page module 320 opens an application to make a reservation at the physical location or place an order to be picked up at the physical location. In one embodiment, the landing page module 320 selects the application to open based on a wait time at the physical location. For example, the landing page module 320 opens a navigation application if the wait time is shorter than a threshold length, but opens a reservation, appointment, or pre-ordering application if the wait time is longer than the threshold length. The threshold length of time may be a fixed value (e.g., thirty minutes), a user setting, or dependent on the entity associated with the advertisement. For example, a threshold length for a restaurant may be longer than a threshold length for a coffee shop.

Figure 5:
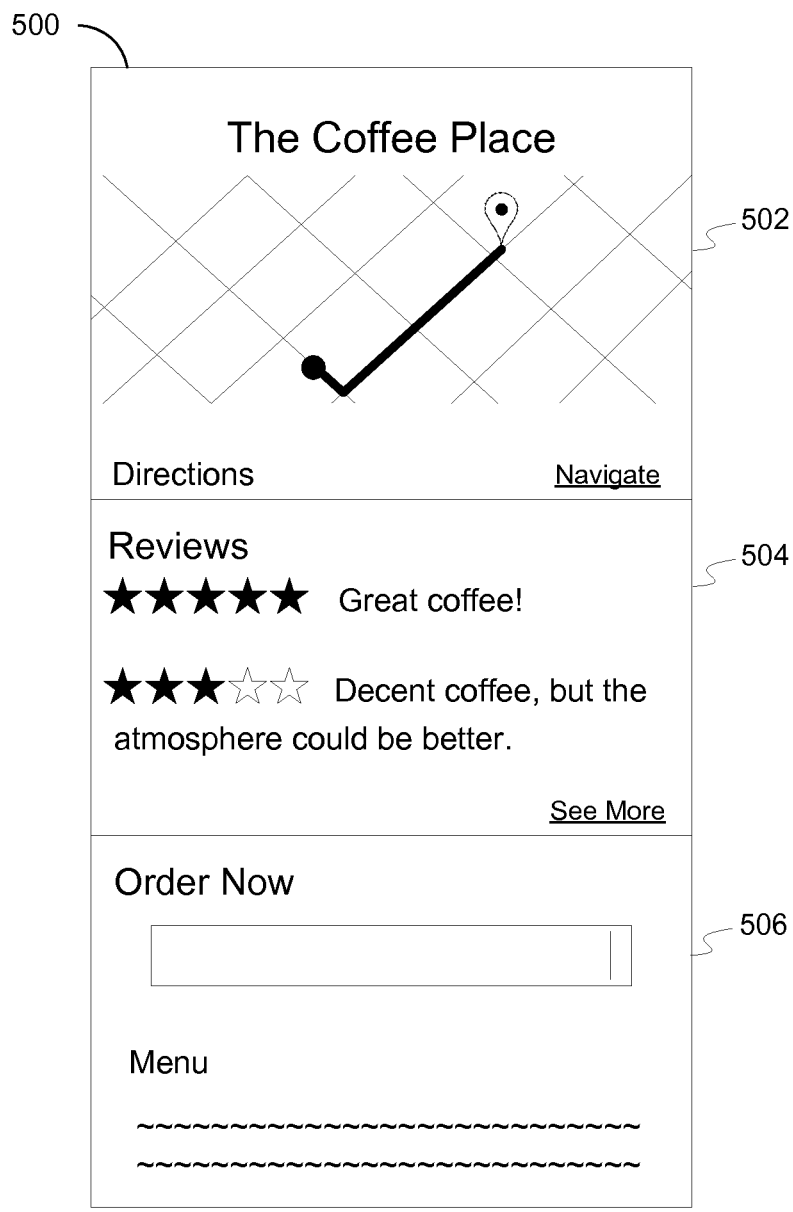
FIG. 5 illustrates an example landing page associated with an advertisement with location content.

An example landing page 500 generated by the landing page module 320 is illustrated in FIG. 5. The landing page 500 is displayed by the client device 110 in response to a user interaction received at an ad associated with a physical location, such as a user input selection of the direction indicator 408 of the ad 400 shown in FIG. 4. In the example shown in FIG. 5, the landing page 500 includes directions 502 to the physical location associated with the ad, reviews 504 for the entity and/or the entity's physical location, and a user interface 506 for pre-ordering items to be picked up at the physical location. Thus, for example, a user can interact with the landing page 500 to place an order at the physical location and navigate to the location to pick up the order. Other information may also be displayed on the landing page 500. In one embodiment, if the landing page 500 is larger than the dimensions of the display of the client device 110, the landing page 500 is vertically or horizontally scrollable.

Displaying Advertisements for Physical Locations

Figure 6:
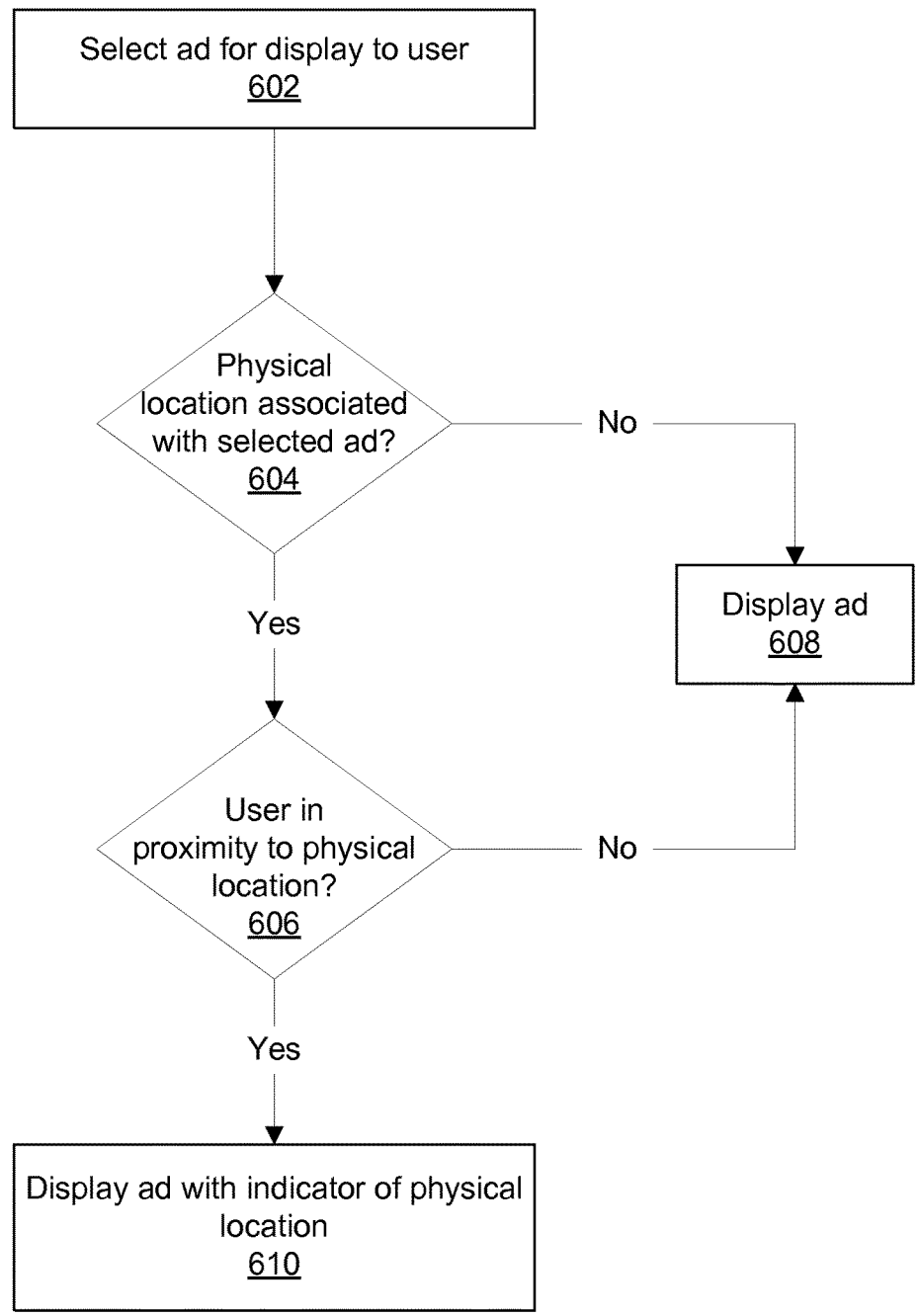
FIG. 6 is a flowchart illustrating a process for displaying advertisements associated with physical locations, according to one embodiment.

FIG. 6 is a flowchart illustrating one embodiment of a process for displaying advertisements associated with physical locations. In one embodiment, the steps of the process are performed by the ad server 235. Other embodiments may perform additional, fewer, or different steps, and the steps may be performed in different orders.

The ad server 235 selects 602 an ad for display to a user via a client device 110 of the user. The ad server 235 may select 602 the ad based on targeting criteria of the ad, a bid amount specified for the ad, and profile information of the user. In one embodiment, the ad server 235 selects 602 an ad for an entity having a physical location near the client device 110 or in proximity to historical or expected locations of the client device 110.

The ad server 235 determines 604 whether there is at least one physical location associated with the selected ad. In one embodiment, the selected ad includes a reference to physical locations of the entity associated with the ad. For example, an advertiser providing the ad content to the ad server 235 specifies one or more physical locations associated with the ad, which are stored in association with the ad content in the ad store 230. In another embodiment, the ad server 235 accesses a website of the entity associated with the ad to retrieve a list of the entity's physical locations.

If the selected ad is associated with a physical location, the ad server 235 determines 606 a proximity of the client device 110 to the physical location. In some embodiments, the ad server 235 determines 606 whether the client device 110 is less than a threshold distance from the physical location at the time the ad is selected. In other embodiments, the ad server 235 determines whether a previous location of the client device 110 was less than a threshold distance from the physical location, or whether a predicted future location of the client device 110 is less than a threshold distance from the physical location.

If the selected ad is not associated with a physical location, or if the client device 110 is not in proximity to the physical location, the ad server 235 displays 608 the ad content of the ad without an indicator of a physical location. For example, the ad server 235 serves the ad content provided by the advertiser to the client device 110 without an explicit reference to a physical location.

In contrast, if the client device 110 is in proximity to the physical location, the ad server 235 displays 610 the ad with an indicator of the physical location. The physical location indicator includes a distance or travel time from the location of the client device 110 to the physical location, a compass heading indicating a direction to the physical location, or other information. In one embodiment, properties of the physical location indictor are modified to provide additional information to the user. For example, the physical location indicator is displayed in a different color or size to indicate distance to the physical location, an amount of traffic between the client device 110 and the physical location, or other information. Furthermore, the physical location indicator may include a selectable link to additional information about the physical location. In one embodiment, the ad server 235 sends a landing page for display by the client device 110 that provides information and various functions related to the physical location, such as directions, reviews, and pre-ordering functions. In another embodiment, the ad server 235 calls one or more applications executing on the client device 110 in response to a user selecting the link in the physical location indicator.

For purposes of illustration, FIG. 6 describes various functionalities provided by the ad server 235 of the social networking system 140. However, in other embodiments, the above-described functionality may be provided by other systems. For example, advertisements associated with physical locations may be provided by any online system, whether the system is an advertiser, an ad publisher, an ad exchange, or another system.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
  receiving, from one or more advertisers, a plurality of advertisements, each advertisement including a set of targeting criteria;
  responsive to an opportunity to advertise to a user, identifying a set of candidate advertisements from the plurality of advertisements for which the user meets the targeting criteria;
  selecting, from the set of candidate advertisements, an advertisement for display to the user by a client device of the user, the selected advertisement comprising advertisement content associated with an entity having a physical location and selected based at least in part on the user satisfying targeting criteria associated with the advertisement content;

receiving, from the client device, a location of the client device;

determining a predicted location of the client device based on the location of the client device and a history of locations of the client device;

determining a proximity of the predicted location of the client device to the physical location associated with the advertisement content by comparing the predicted location of the client device to the physical location associated with the advertisement content;

responsive to determining the proximity of the predicted location of the client device to the physical location associated with the advertisement content, generating an augmented advertisement including the advertisement content, an indicator providing a distance between the predicted location of the client device and the physical location, and a link indicating a wait time at the physical location;

sending the augmented advertisement to the client device for display to the user; and responsive to the wait time being longer than the threshold, displaying a page enabling the user to place an order at the physical location.

2. The method of claim 1, wherein the entity has a plurality of physical locations, and wherein generating the augmented advertisement comprises:

selecting one of the plurality of physical locations closest to the client device; and generating the indicator of the physical location to identify a distance between the selected physical location and the location of the client device.

3. The method of claim 1, wherein the entity has a plurality of physical locations, and wherein generating the augmented advertisement comprises:

selecting one of the plurality of physical locations having a shortest wait time; and generating the indicator of the physical location to identify a distance between the selected physical location and the location of the client device.

4. The method of claim 1, wherein determining the proximity of the predicted location of the client device to the physical location associated with the advertisement content comprises:

determining a current location of the client device;

determining a distance between the current location of the client device and the physical location; and responsive to the distance between the current location of the client device and the physical location being less than a threshold distance, determining the proximity.

5. The method of claim 1, wherein determining the proximity of predicted location of the client device to the physical location associated with the advertisement content comprises:

determining a historical location of the client device;

determining a distance between the historical location of the client device and the physical location; and responsive to the distance between the historical location of the client device and the physical location being less than a threshold distance, determining the proximity.

6. The method of claim 1, wherein determining the proximity of the predicted location of the client device to the physical location associated with the advertisement content comprises:

determining a distance between the predicted location of the client device and the physical location; and responsive to the distance between the predicted location of the client device and the physical location being less than a threshold distance, determining the proximity.

7. The method of claim 1, wherein the augmented advertisement further includes an identifier of hours the physical location is open.

8. The method of claim 1, wherein the indicator of the physical location further comprises a compass heading indicating a direction to the physical location.

9. The method of claim 1, wherein the indicator of the physical location is color coded to indicate an amount of traffic between the client device and the physical location.

10. The method of claim 1, wherein receiving the location of the client device comprises:

receiving, at periodic intervals, the location of the client device from the client device;

storing the received locations at a location log;

accessing the location log; and selecting a most recent location from the location log to use for the location of the client device.

11. A computer program product comprising a non-transitory computer readable storage medium having instructions encoded thereon that, when executed by a processor, cause the processor to:

receive, from one or more advertisers, a plurality of advertisements, each advertisement including a set of targeting criteria;

responsive to an opportunity to advertise to a user, identify a set of candidate advertisements from the plurality of advertisements for which the user meets the targeting criteria;

select, from the set of candidate advertisements, an advertisement for display to the user by a client device of the user, the selected advertisement comprising advertisement content associated with an entity having a physical location and selected based at least in part on the user satisfying targeting criteria associated with the advertisement content;

receive, from the client device, a location of the client device;

determine a predicted location of the client device based on the location of the client device and a history of locations of the client device;

determine a proximity of the predicted location of the client device to the physical location associated with the advertisement content by comparing the predicted location of the client device to the physical location associated with the advertisement content;

responsive to determining the proximity of the predicted location of the client device to the physical location associated with the advertisement content, generate an augmented advertisement including the advertisement content, an indicator providing a distance between the predicted location of the client device and the physical location, and a link indicating a wait time at the physical location;

send the augmented advertisement to the client device for display to the user; and responsive to the wait time being longer than a threshold, display a page enabling the user to place an order at the physical location.

12. The computer program product of claim 11, wherein the entity has a plurality of physical locations, and wherein generating the augmented advertisement comprises:

selecting one of the plurality of physical locations closest to the client device; and generating the indicator of the physical location to identify a distance between the selected physical location and the location of the client device.

13. The computer program product of claim 11, wherein the entity has a plurality of physical locations, and wherein generating the augmented advertisement comprises:

selecting one of the plurality of physical locations having a shortest wait time; and generating the indicator of the physical location to identify a distance between the selected physical location and the location of the client device.

14. The computer program product of claim 11, wherein determining the proximity of the predicted location of the client device to the physical location associated with the advertisement content comprises:

determining a current location of the client device;

determining a distance between the current location of the client device and the physical location; and responsive to the distance between the current location of the client device and the physical location being less than a threshold distance, determining the proximity.

15. The computer program product of claim 11, wherein determining the proximity of the predicted location of the client device to the physical location associated with the advertisement content comprises:

determining a historical location of the client device;

determining a distance between the historical location of the client device and the physical location; and responsive to the distance between the historical location of the client device and the physical location being less than a threshold distance, determining the proximity.

16. The computer program product of claim 11, wherein determining the proximity of the predicted location of the client device to the physical location associated with the advertisement content comprises:

determining a distance between the predicted location of the client device and the physical location; and responsive to the distance between the predicted location of the client device and the physical location being less than a threshold distance, determining the proximity.

17. The computer program product of claim 11, wherein the augmented advertisement further includes an identifier of hours the physical location is open.

18. A system, comprising:

an ad targeting module adapted to:

receive, from one or more advertisers, a plurality of advertisements, each advertisement including a set of targeting criteria;

responsive to an opportunity to advertise to a user, identify a set of candidate advertisements from the plurality of advertisements for which the user meets the targeting criteria;

select, from the set of candidate advertisements, an advertisement for display to the user by a client device of the user, the selected advertisement comprising advertisement content associated with an entity having a physical location and selected based at least in part on the user satisfying targeting criteria associated with the advertisement content;

a location module adapted to:

receive, from the client device, a location of the client device;

determine a predicated location of the client device based on the location of the client device and a history of locations of the client device; and determine a proximity of the predicted location of the client device to the physical location associated with the advertisement content by comparing the predicted location of the client device to the physical location associated with the advertisement content; and an ad display module adapted to:

generate an augmented advertisement including the advertisement content, an indicator providing a distance between the predicted location of the client device and the physical location, and a link indicating a wait time at the physical location;

send the augmented advertisement to the client device for display to the user; and responsive to the wait time being longer than the threshold, display a page enabling the user to place an order at the physical location.

19. The system of claim 18, wherein the entity has a plurality of physical locations, and wherein the ad display module is adapted to generate the augmented advertisement by:

selecting one of the plurality of physical locations having a shortest wait time; and generating the indicator of the physical location to identify a distance between the selected physical location and the location of the client device.

20. The system of claim 18, wherein the location module is adapted to determine the proximity of the client device to the physical location associated with the advertisement content by:

determining a distance between the predicted location of the client device and the physical location; and responsive to the distance between the predicted location of the client device and the physical location being less than a threshold distance, determining the proximity.

* * * * *

UNITED STATES PATENT AND TRADEMARK OFFICE
CERTIFICATE OF CORRECTION

PATENT NO. : 10,475,077 B2
APPLICATION NO. : 14/305997
DATED : November 12, 2019
INVENTOR(S) : Erick Tseng and Michael John Toksvig Page 1 of 1

It is certified that error appears in the above-identified patent and that said Letters Patent is hereby corrected as shown below:

In the Claims

Column 18, Line 15, Claim 18, delete "predicated" and insert --predicted--

Signed and Sealed this
Second Day of June, 2020

Andrei Iancu
*Director of the United States Patent and Trademark Office*